United States Patent [19]
Ljubarsky et al.

[11] 3,760,504
[45] Sept. 25, 1973

[54] PARALLELOMETER

[76] Inventors: Efim Matveevich Ljubarsky, ulitsa Udaltsova 45, kv. 6; Nikolai Vasilievich Igonkin, prospekt Mira, 200, korpus 2, kv. 47; Sergei Matveevich Eidinov, ulitsa Nizhne-Pervomaiskaya, 24, kv. 104, all of Moscow, U.S.S.R.

[22] Filed: Feb. 22, 1972

[21] Appl. No.: 228,159

[52] U.S. Cl. .................................................. 32/63
[51] Int. Cl. .............................................. A61c 5/12
[58] Field of Search ......................................... 32/63

[56] References Cited
UNITED STATES PATENTS
1,230,156  6/1917  Hanau .................................. 32/67

*Primary Examiner*—Robert Peshock
*Attorney*—Eric H. Waters et al.

[57] ABSTRACT

A parallelometer comprising a platen for a jaw pattern and a support with a chuck for a working tool, secured on a common base. To set the platen with the jaw pattern to such a position relative to the working tool axis which is required for marking the topographical line on the teeth while determining the path of prosthetic device introduction by the bisectrix of the tooth inclination angle, the parallelometer has a sleeve with a socket for the working tool secured in the chuck, said sleeve being provided with a system of articulated rods intended to be aligned with the tooth axes and forming a rhomboid structure with changeable angles, one of the structure diagonals being directed along the axis of the working tool secured in the sleeve.

3 Claims, 2 Drawing Figures

PARALLELOMETER

The present invention relates to stomatological technology and more particularly it relates to the parallelometers for planning the designs of dental plates, e.g. skeleton and splinting prosthetic devices. Known in the art is a parallelometer (see, for example, Botger e.a. "Prosthetic dentistry," volume II, pp. 508–511, Leipzig, 1965) comprising a platen for the jaw pattern and a support with a chuck for fixing the working tool, both the platen and support being secured on a common base. The chuck and the platen are capable of moving relative to each other perpendicularly to the chuck axis and towards each other.

For finding the bisectrix of the angle between the teeth, the platen with the jaw pattern is inclined so as to align the axes of said teeth with the axis of the working tool and the tooth axes are marked on the pattern base. Then, geometrical plotting is used for determining the line passing approximately half-way between the marked tooth axes and, taking this line for the bisectrix of the tooth inclination angle, it is aligned with the working tool axis and a reference topographical line is marked on the teeth, thus determining the path for the introduction of the prosthetic device.

However, the known parallelometer is not adapted for accurate determination of the bisectrix of the tooth inclination angle which distorts the determination of the path of introduction of the prosthetic device. Besides, the finding of the middle line taken for the bisectrix of the tooth inclination angle by additional geometrical plotting (i.e., by dividing the angle or lengths into approximately equal parts) wastes time and complicates considerably the process of parallelometry.

An object of the invention is to provide a parallelometer which would simplify geometrical plotting on the jaw pattern, ensure a higher accuracy of determining the bisectrix of the tooth inclination angle and would mechanically determine the path of introduction of the prosthetic device in accordance with the found bisectrix of the angle.

This object is accomplished by providing a parallelometer comprising a platen for the jaw pattern and a support with a chuck for the working tool secured on a common base, said chuck and platen being capable of moving relative to each other perpendicularly to the chuck axis and towards each other wherein, according to the invention the parallelometer is provided with a means for setting the platen with the jaw pattern to such a position relative to the working tool axis, which is required for marking the topographical line on the teeth while determining the path of prosthetic device introduction by the bisectrix of the tooth inclination angle, said means being made in the form of a sleeve fastened in the parallelometer chuck, having a socket for the working tool and a system of articulated rods intended for alignment with the tooth axes and forming a rhomboid structure with changeable angles, one of the structure diagonals being directed along the axis of the working tool secured in the sleeve.

It is practicable that the system of articulated rods should be made of two pairs of articulated rods, one end of the rods in each pair being articulated to the sleeve while the opposite ends should be articulated by a plate to a longitudinally-movable rod, located parallel to the axis of the working tool secured in the sleeve socket, and provided with a thread interacting with a rotatable drive nut fastened on the sleeve.

It is desirable that said plate should have a guide opening for the working tool.

An advantage of the parallelometer according to the invention lies in the simplicity of its design, a high accuracy of determining the bisectrix of the tooth inclination angle and a mechanical determination of the introduction path of the dental plate in accordance with the found bisectrix of the angle.

Now the invention will be described in detail by way of example with reference to the accompanying drawings in which.

Figure 1:
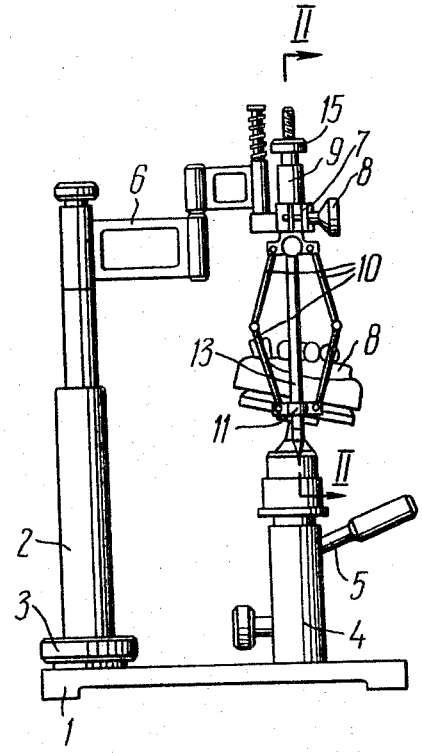
FIG. 1 is a diagrammatic general view of the parallelometer with the jaw pattern according to the invention.

The parallelometer consists of a base 1 (FIG. 1) on which a support 2 is mounted, provided wit a screw 3 for moving it, and a platen 4 provided with a locking handle 5.

Figure 2:
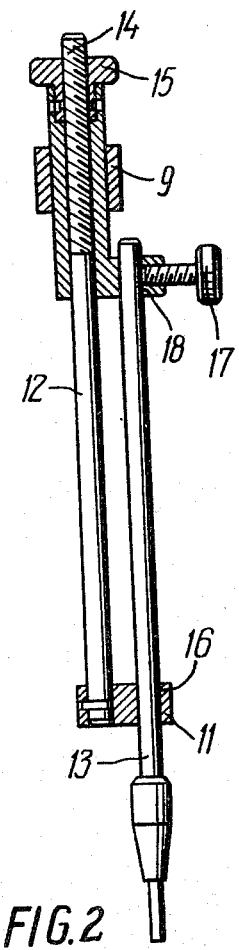
FIG. 2 is a partial section taken on line II—II in FIG. 1, enlarged.

Installed on the support 2 is a two-arm bracket 6 carrying a chuck 7 and capable of moving it perpendicularly to its axis. The parallelometer incorporates a means for setting the platen 4 with the jaw pattern 8 to such a position relative to the working tool which is required for marking the topographical reference line on the teeth, said means being made in the form of a sleeve 9 fastened in the chuck 7 and carrying two pairs of articulated rods 10, one end of the rods in each pair being articulated to the sleeve 9 while the opposite ends should be articulated by a plate 11 to a longitudinally-movable rod 12 (FIG. 2), located parallel to the axis of a working tool 13 and provided with a thread 14 interacting with a rotatable drive nut 15 fastened on the sleeve 9.

The working tool 13 is inserted into the guide opening 16 of the plate 11 and is held by a screw 17 in the socket 18 of the sleeve 9.

The parallelometer functions as follows.

The jaw pattern 8 is placed on the platen 4. The two-arm bracket 6 is brought close to one of the pattern surfaces, e.g. frontal one and, depending on the direction of inclination (inward or outward) of the pair of teeth whose inclination angle bisectrix has to be determined, the screw 3 is rotated so as to set the system of rods 10 to a position in which the upper or lower rods 10 would be positioned level with the teeth of the jaw pattern 8.

Then, by rotating the drive nut 15 and inclining the platen 4, the rods 10 are aligned with the axes of said pair of teeth and the position of the platen 4 is fixed by the locking handle 5.

In this position the axis of the rod 12 (FIG. 2) will serve as the bisectrix of the inclination angle of the tooth pair being determined and said bisectrix is marked on the base of the jaw pattern 8 (FIG. 1) by drawing a pencil line parallel to the generating line of the rod 12.

A similar procedure is followed for finding the bisectrix of the angle of the next pair of teeth of the jaw pattern 8, said teeth lying in another plane, e.g., a side plane. Then the rods 10 are aligned with the obtained bisectrices on both planes and the angle of the platen 4 is fixed by the locking handle 5.

Now, the working tool 13, e.g., a bar with a slate pencil is inserted into the guide opening 16 (FIG. 2) of the platen 11 and into the socket 18 of the sleeve 9 and secured by the screw 17 after which the screw 3 (FIG. 1) is rotated in order to lift the two-arm bracket 6 and thus to bring the slate pencil of the working tool 13 to the tooth level of the jaw pattern 8. Turning the two-arm bracket 6 in the required direction, mark the topographical line on the teeth with the slate pencil of the working tool 13 and this line will show the path of introduction of the dental plate and will be used for selecting and marking out the design of the dental plate.

The parallelometer according to the invention can be used with changeable working tools for different stages of parallelometry such as determining the retention limits of hooks, installing attachment locks, etc.

What is claimed is:

1. A parallelometer comprising a base; a platen for a jaw pattern being secured to said base; a support mounted on said base; a chuck fastened to said support; a two-armed hinged lever interconnecting said chuck and platen for relative movement perpendicularly to the axis of said chuck and towards each other; a sleeve secured in said chuck; a socket in said sleeve for mounting a tooth-marking working tool; means connected to said sleeve extending parallel to said working tool; a system of articulated rods extending between and being fastened to said last-mentioned means and said sleeve, said rods adapted to be aligned with the tooth axes in said jaw pattern and forming a rhomboid structure with changeable angles, one of the diagonals of said rhomboid structure being directed along the axis of the working tool in said sleeve.

2. A parallelometer according to claim 1 wherein said system of rods comprises two pairs of articulated rods; one end of the rods in each of said pair of rods is articulated to said sleeve; said parallel extending means including a longitudinally-movable rod arranged parallel to the axis of the working tool secured in said sleeve socket; a plate fastened to said rod; other ends of said rods in each of said pairs of rods, articulated to said plate; a drive nut fastened to said sleeve; a thread on the end of said rod, interacting with said drive nut.

3. A parallelometer according to claim 2 wherein said plate has a guide opening for the working tool.

* * * * *